US010652362B1

(12) United States Patent
Kudari et al.

(10) Patent No.: US 10,652,362 B1
(45) Date of Patent: May 12, 2020

(54) VENDOR NON-SPECIFIC COMPUTER SERVER SOFTWARE SYSTEM

(71) Applicant: State Farm Mutual Automobile Insurance Company, Bloomington, IL (US)

(72) Inventors: Elia Kudari, Bloomington, IL (US); Shaun Callighan, Bloomington, IL (US); Daniel Ray Eberle, Bloomington, IL (US); Michael Dale Carlson, Decatur, IL (US); Gary D. Trovillion, Atlanta, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

(21) Appl. No.: 16/022,015

(22) Filed: Jun. 28, 2018

(51) Int. Cl.
*H04L 29/08* (2006.01)
*H04L 29/06* (2006.01)
*H04L 12/24* (2006.01)

(52) U.S. Cl.
CPC .......... *H04L 67/34* (2013.01); *H04L 41/0253* (2013.01); *H04L 41/0813* (2013.01); *H04L 41/0883* (2013.01); *H04L 63/107* (2013.01)

(58) Field of Classification Search
CPC . H04L 67/34; H04L 41/0253; H04L 41/0813; H04L 41/0883; H04L 63/107
USPC ...................................................... 709/220
See application file for complete search history.

(56) References Cited

U.S. PATENT DOCUMENTS

| 10,225,162 | B1* | 3/2019 | Jain ..................... G06F 3/0605 |
| 2004/0161235 | A1* | 8/2004 | Halgren .............. H04J 14/0227 398/45 |
| 2009/0177789 | A1* | 7/2009 | Choudhury ........... H04L 63/104 709/229 |
| 2013/0031131 | A1* | 1/2013 | Minocha ................ G06Q 10/06 707/770 |
| 2014/0201381 | A1* | 7/2014 | Shimizu .............. H04L 67/2823 709/230 |
| 2014/0372513 | A1 | 12/2014 | Jones |

(Continued)

OTHER PUBLICATIONS

Wikipedia, Bare Machine, Mar. 24, 2018, https://en.wikipedia.org/w/index.php?title=Bare machine&oldid=832241445 (Year: 2018).*

*Primary Examiner* — James E Springer

(57) ABSTRACT

A computer server software system implemented on a computing device comprises a bare metal automation interface, a request processor, a scheduler, a vendor non-specific bare metal interface, and an orchestration engine. The bare metal automation interface is configured to receive requests for configuration of one or more of a plurality of servers. The request processor is configured to receive the requests from the bare metal automation interface and to forward the requests. The scheduler is configured to receive instructions from a runtime environment in which the computer server software system operates and forward the instructions. The vendor non-specific bare metal interface is configured to interface with a plurality of vendor-specific server interfaces, wherein each vendor-specific server interface communicates with a server from the specific vendor. The orchestration engine is configured to execute a workflow for the requests from the request processor and for the instructions from the scheduler.

20 Claims, 7 Drawing Sheets

(56) References Cited

U.S. PATENT DOCUMENTS

| | | | |
|---|---|---|---|
| 2015/0271296 A1* | 9/2015 | Borzycki | G06F 21/6218 |
| | | | 709/202 |
| 2015/0365492 A1* | 12/2015 | Kalan | G06Q 10/0637 |
| | | | 700/83 |
| 2016/0011882 A1 | 1/2016 | Johnson et al. | |
| 2016/0080287 A1 | 3/2016 | Mogul et al. | |
| 2016/0226874 A1* | 8/2016 | Wiest | H04L 63/0884 |
| 2019/0132888 A1* | 5/2019 | Myers, III | H04W 8/12 |
| 2019/0332412 A1* | 10/2019 | Boggarapu | G06F 9/5077 |

* cited by examiner

| CONFIGURATION | | | | | | | | WELCOME, 🚪 HELP ❓ | | |
|---|---|---|---|---|---|---|---|---|---|---|
| SERVER INFO - BMC INFORMATION | | | | | | | | | | |
| ALL COFIGINATED STATES ⇕ | EDCR ⇕ | ZONE_1_HALL_1_SOUTH ⇕ | ALL CABINETS/RACKS ⇕ | ALL SUBNETS ⇕ | ALL GATEWAYS ⇕ | ALL MAKES ⇕ | ALL MODELS ⇕ | VIEW | | |
| FILTER... | EXPORT HOSTS INFORMATION | | | | | | | | | |
| # | IDRAC ADDRESS ⇕ | SERVICE TAG ⇕ | ⇕ | DATA CENTER ⇕ | LOCATION ⇕ | CABINET ⇕ | STATIC IP ⇕ | MAKE ⇕ | MODEL ⇕ | CONFIGURATIONS ⇕ |
| 1 | -7973543 | 3VZ | ⊗ | EDCR | ZONE_1_HALL_1_SOUTH | R2901D051 | | | R730XD-DATA NODE | R730XD_INIC_R5_0_9;IDRAC SYSLOG |
| 2 | -7277194 | 2BL | ⊗⊗ | EDCR | ZONE_1_HALL_1_SOUTH | | | DELL | | IDRAC SYSLOG |
| 3 | -7190844 | GSC | ⊗⊗ | EDCR | ZONE_1_HALL_1_SOUTH | | | DELL | | IDRAC SYSLOG |
| 4 | -7277336 | 2B8 | ⊗⊗ | EDCR | ZONE_1_HALL_1_SOUTH | | | DELL | | IDRAC SYSLOG |
| 5 | -7277323 | 1S6 | ⊗ | EDCR | ZONE_1_HALL_1_SOUTH | | | DELL | | IDRAC SYSLOG |
| 6 | -7973524 | 3VZ | ⊗⊗ | EDCR | ZONE_1_HALL_1_SOUTH | R2901D050 | | | R730XD-DATA NODE | R730XD_INIC_R5_0_9;IDRAC SYSLOG |
| 7 | -7190510 | GW | ⊗⊗ | EDCR | ZONE_1_HALL_1_SOUTH | | | DELL | | IDRAC SYSLOG |
| 8 | -7190491 | GW | ⊗⊗ | EDCR | ZONE_1_HALL_1_SOUTH | | | DELL | | IDRAC SYSLOG |
| 9 | -7277293 | 1R6 | ⊗⊗ | EDCR | ZONE_1_HALL_1_SOUTH | | | DELL | | IDRAC SYSLOG |
| 10 | -7277195 | 2BM | ⊗⊗ | EDCR | ZONE_1_HALL_1_SOUTH | | | DELL | | IDRAC SYSLOG |
| 11 | -7277640 | 2BJ | ⊗⊗ | EDCR | ZONE_1_HALL_1_SOUTH | | | DELL | | IDRAC SYSLOG |
| 12 | -7277292 | 1R4 | ⊗⊗ | EDCR | ZONE_1_HALL_1_SOUTH | | | DELL | | IDRAC SYSLOG |
| 13 | -7973559 | 3WR | ⊗⊗⊗ | EDCR | ZONE_1_HALL_1_SOUTH | R2901D051 | | | R730XD-DATA NODE | R730XD_INIC_R0_0_23;IDRAC SYSLOG |
| 14 | -7277198 | 2BH | ⊗⊗ | EDCR | ZONE_1_HALL_1_SOUTH | | | DELL | | IDRAC SYSLOG |
| 15 | -7277196 | 2BM | ⊗⊗ | EDCR | ZONE_1_HALL_1_SOUTH | | | DELL | | IDRAC SYSLOG |
| 16 | -7277319 | 1S6 | ⊗⊗ | EDCR | ZONE_1_HALL_1_SOUTH | | | DELL | | IDRAC SYSLOG |
| 17 | -7190511 | GS2 | ⊗⊗ | EDCR | ZONE_1_HALL_1_SOUTH | | | DELL | | IDRAC SYSLOG |
| 18 | 7277308 | 1R6 | ⊗⊗ | EDCR | ZONE_1_HALL_1_SOUTH | | | DELL | | IDRAC SYSLOG |
| 19 | -7277311 | 1R2 | ⊗⊗ | EDCR | ZONE_1_HALL_1_SOUTH | | | DELL | | IDRAC SYSLOG |
| 20 | -7190499 | GS4 | ⊗⊗ | EDCR | ZONE_1_HALL_1_SOUTH | | | DELL | | IDRAC SYSLOG |
| 21 | -7277329 | 2B8 | ⊗⊗ | EDCR | ZONE_1_HALL_1_SOUTH | | | DELL | | IDRAC SYSLOG |
| 22 | -7277356 | 1R3 | ⊗⊗ | EDCR | ZONE_1_HALL_1_SOUTH | | | DELL | | IDRAC SYSLOG |
| 23 | -7973542 | 3W0 | ⊗⊗ | EDCR | ZONE_1_HALL_1_SOUTH | R2901D051 | | | R730XD-DATA NODE | R730XD_INIC_R5_0_9;IDRAC SYSLOG |
| 24 | -7277283 | 1R5 | ⊗⊗ | EDCR | ZONE_1_HALL_1_SOUTH | | | DELL | | IDRAC SYSLOG |

COMPLETED

DETAILS

| TASK NAME | STATUS | TIME STAMP | OUTCOME |
|---|---|---|---|
| USE_PREDEFINED_XMLS | COMPLETED | 05/02/2018 14:05:13 UTC | UPLOADED PREDEFINED CONFIG FILES SUCCESSFULLY [(R730_ENIC_R1_0_1=63B44B2E38AF4A09A72B3E_0.XML,IDRC SYSLOG=63B44B2E38AF4A09A72B3E_1.XML]] |
| GET_MODEL_NAME | COMPLETED | 05/02/2018 14:05:13 UTC | NOT USED |
| GET_DHCP_IP | COMPLETED | 05/02/2018 14:05:13 UTC | IDRAC_2QN |
| GET_DHCP_SVCTAG | COMPLETED | 05/02/2018 14:05:13 UTC | 2QN |
| SET_STATIC_IP_INFO | COMPLETED | 05/02/2018 14:05:26 UTC | 2QNC |
| CHECK_CSIOR_ENABLED | COMPLETED | 05/02/2018 14:05:30 UTC | SUCCESSFULLY VERIFIED COLLECT SYSTEM INVERTORY ON RESTART |
| UPDATE_FIRMWARE | COMPLETED | 05/02/2018 14:30:27 UTC | FIRMWARE UPDATE SUCCESSFULLY COMPLETED[(JID_25287924O317=COMPLETED,JID_252878744313=COMPLETED,JID_2528795229 11= COMPLETED RID_25288053370=REBOOT COMPLETED,JID_25287993080=COMPLETED,JID_25288923910 2=COMPLETED)] |
| UPLOADED_CONFIG_ FILE_NAME | COMPLETED | 05/02/2018 14:05:13 UTC | R730_ENIC_R1_0_1[63B44B2E38AF4A09A72BE_0.XML] |
| PUSH_IDRAC_CONFIG | COMPLETED | 05/02/2018 14:30:32 UTC | JID_252891925350 |
| VERIFY_APPLYING_ CONFIG | COMPLETED | 05/02/2018 14:40:37 UTC | SYS055: IMPORT OF SYSTEM CONFIGURATION XML FILE OPERATION COMPLETED WITH ERRORS. IMPORTING: SYSTEM CONFIGURATION IN PROGRESS. PRECENT COMPLETE=64 IMPORTING: SYSTEM CONFIGURATION IN PROGRESS. PRECENT COMPLETE=46 |
| UPLOADED_CONFIG_ FILE_NAME | COMPLETED | 05/02/2018 14:05:13 UTC | IDRAC SYSLOG[63B44B2E38AF4A09A72BE_1.XML] |
| PUSH_IDRAC_CONFIG | COMPLETED | 05/02/2018 14:40:44 UTC | JID_252898036238 |
|  |  | 05/02/2018 | SYS053: SUCCESSFULLY IMPORTED AND APPLIED SYSTEM CONFIGURATION XML FILE. |

VENDOR NON-SPECIFIC COMPUTER SERVER SOFTWARE SYSTEM

BACKGROUND OF THE INVENTION

Field of the Invention

Embodiments of the current invention relate to software interface that configures computer servers.

Description of the Related Art

Large organizations, such as insurance providers and financial institutions, often have a very large volume of data to store and process. These organizations may also have memory needs to support software and hardware based applications and products. Furthermore, each organization may have a variety of types of data to store, such as email, client personal data, client records, billing, etc., as well as a variety of software applications or products. The default medium for these types of needs is a computer server which includes a plurality of storage, processing, network, and memory devices. These devices, such as hard disk drives, processing units, memory, and network cards, may be housed in a single machine case or multiple machines, which may be mounted in racks. An organization may have these types of machines, servers, or storage devices that are produced by multiple vendors. Each vendor may have a specific protocol or interface for the manner in which these machines or servers can be managed, making it time-consuming and tedious for computer system administrators to set up and keep track of these systems.

SUMMARY OF THE INVENTION

Embodiments of the current invention solve the above-mentioned problems and provide a distinct advance in the art of automatic configuration of data storage systems including a plurality of computer servers. One embodiment provides a computer server software system that is implemented on a computing device. The system comprises a bare metal automation interface, a request processor, a scheduler, a vendor non-specific bare metal interface, and an orchestration engine. The bare metal automation interface is configured to receive requests for configuration of one or more of a plurality of servers. The request processor is configured to receive the requests from the bare metal automation interface and to forward the requests. The scheduler is configured to receive instructions from a runtime environment in which the computer server software system operates and forward the instructions. The vendor non-specific bare metal interface is configured to interface with a plurality of vendor-specific server interfaces, wherein each vendor-specific server interface communicates with a server from the specific vendor. The orchestration engine is configured to execute a workflow for the requests from the request processor and for the instructions from the scheduler.

Another embodiment provides a computer server software system that is implemented on a computing device. The system comprises a bare metal automation interface, a request processor, a scheduler, a vendor non-specific bare metal interface, and an orchestration engine. The bare metal automation interface is configured to receive requests for configuration of one or more of a plurality of servers. The requests are received from a user using a web browser and other systems using a representational state transfer and simple object access protocol interface. The request processor is configured to receive the requests from the bare metal automation interface and to forward the requests. The scheduler is configured to receive instructions from a runtime environment in which the computer server software system operates and forward the instructions. The vendor non-specific bare metal interface is configured to interface with a plurality of vendor-specific server interfaces, wherein each vendor-specific server interface communicates with a server from the specific vendor. The vendor non-specific bare metal interface is also configured to receive vendor-non-specific commands intended for a server and to transmit corresponding vendor-specific commands to the vendor-specific server interface for the server. The orchestration engine is configured to execute a workflow for the requests from the request processor and for the instructions from the scheduler.

Yet another embodiment provides a computer server software system that is implemented on a computing device. The system comprises a bare metal automation interface, a request processor, a scheduler, an alert and notification generator, an authentication and authorization interface, a persistence storage interface, a GIT interface, a vendor non-specific bare metal interface, and an orchestration engine. The bare metal automation interface is configured to receive requests for configuration of one or more of a plurality of servers. The request processor is configured to receive the requests from the bare metal automation interface and to forward the requests. The scheduler is configured to receive instructions from a runtime environment in which the computer server software system operates and forward the instructions. The alert and notification generator is configured to notify users of a status of a request or to alert system administrators if an error occurs. The authentication and authorization interface is configured to forward a user's credentials to a lightweight directory access protocol device or an active directory device. The persistence storage interface is configured to forward data regarding the servers to a bare metal asset information database. The GIT interface configured to forward a user's credentials to a GIT system. The vendor non-specific bare metal interface is configured to interface with a plurality of vendor-specific server interfaces, wherein each vendor-specific server interface communicates with a server from the specific vendor. The orchestration engine is configured to execute a workflow for the requests from the request processor and for the instructions from the scheduler.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 5 is a third screen capture of the user interface, the third screen capture illustrating a list of filters that can be applied to a requested configuration;

FIG. 6 is a fourth screen capture of the user interface, the fourth screen capture illustrating a log of the results of a requested configuration; and FIG. 7 is a fifth screen capture of the user interface, the fifth screen capture illustrating a log of particular activities associated with a requested configuration.

Figure 1:
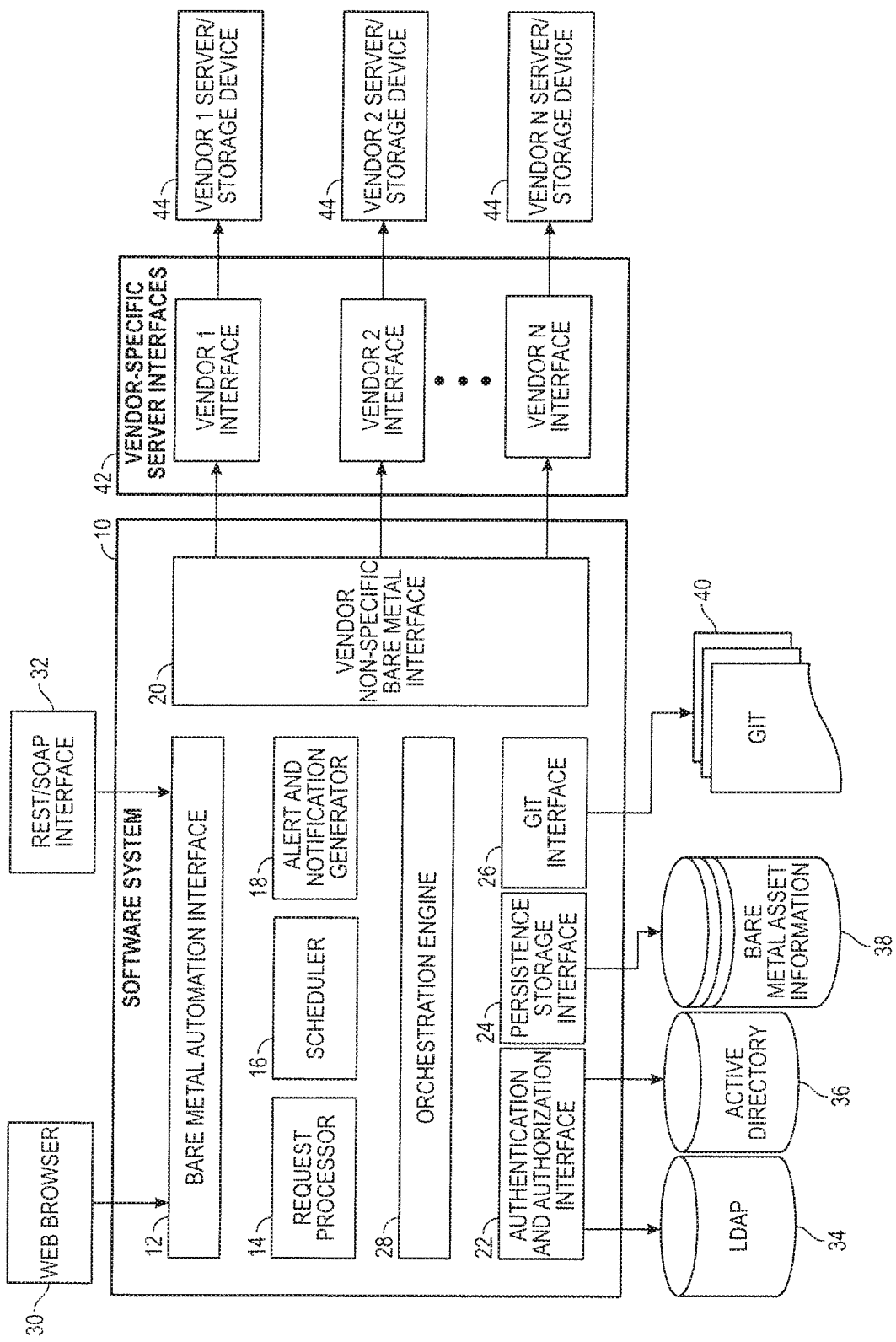
FIG. 1 is a schematic block diagram illustrating a vendor non-specific computer server software system, constructed in accordance with various embodiments of the current invention.
Figure 2:
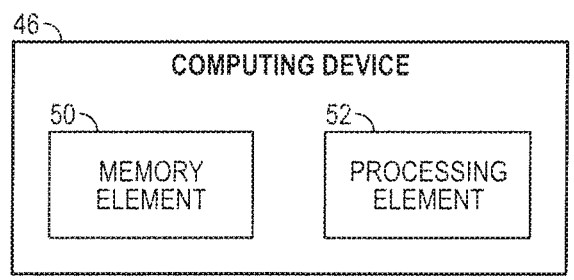
FIG. 2 is a schematic block diagram of a computing device which implements the vendor non-specific computer server software system.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

A vendor non-specific computer server software system 10, constructed in accordance with various embodiments of the current invention, is shown in FIG. 1 and broadly comprises a bare metal automation interface 12, a request processor 14, a scheduler 16, an alert and notification generator 18, a vendor non-specific bare metal interface 20, an authentication and authorization interface 22, a persistence storage interface 24, a GIT interface 26, and an orchestration engine 28. The system 10 may receive input from a web browser 30 and a representational state transfer (REST)/simple object access protocol (SOAP) interface 32. The system 10 may provide output to a lightweight directory access protocol (LDAP) device 34, an active directory device 36, a bare metal asset information database 38, a GIT system 40, and a plurality of vendor-specific server interfaces 42. The vendor-specific server interfaces 42 communicate with a plurality of servers 44 or storage devices. The vendor non-specific computer server software system 10 may be implemented or executed on a computing device 46.

The web browser 30 generally provides user access to the vendor non-specific computer server software system 10, wherein users of the system 10 may be managers or administrators of the data from various groups within an organization, such as an insurance provider or a financial institution. Each group may want to access, read, or write data to the servers 44. The web browser 30, as is commonly known, accesses information on the web. In this instance, the web browser 30 accesses the vendor non-specific computer server software system 10 and presents users with a user interface 48 that allows the user to submit requests for services or select the actions and features of the system 10.

The REST/SOAP interface 32 generally provides communication with other systems executing programs and applications using architectures, such as the REST architecture, and protocols, such as the SOAP protocol. The other systems may want to access, read, or write data to the servers 44 as a result of on-demand or automated processes executed by the systems.

The LDAP device 34 and the active directory device 36 generally provide directory information services, such as a central place to store usernames and passwords. The LDAP device 34 and the active directory device 36 may allow various applications and processes to validate users.

The bare metal asset information database 38 generally stores information related to the servers 44 or data storage devices, along with network components and the like. The information may include names of servers 44 or other equipment, identifiers such as barcodes, radio frequency identifiers (RFIDs), unique identifiers, and the like.

The GIT system 40 generally provides version control for tracking changes in computer files and coordinating work on those files among multiple people.

Each vendor-specific server interface 42 is a software interface that is provided to enable communication with the server(s) 44 from a particular vendor. The organization in which the vendor non-specific computer server software system 10 is utilized may have servers 44 from a plurality of different vendors. Each vendor-specific server interface 42 may include specific protocols, rules, or formats about the way in which data is stored on and read from the associated server(s) 44.

Each server 44 generally retains electronic data and responds to requests to retrieve data as well as to store data. The server 44 may function as an application server, a database server, a file server, a mail server, a web server, or the like. The server 44 may also include processors, memory storage such as optical drives, hard disk drives, rack-mount drives, blade drives, a cabinet, and the like, and transceiver components that receive communication from the vendor non-specific computer server software system 10.

The computing device 46 generally implements or executes the vendor non-specific computer server software system 10 and may be embodied by a desktop computer, a workstation computer, a server computer, or the like. In some embodiments, the computing device 46 may be retained in one of the servers 44. The computing device 46 broadly comprises a memory element 50 and a processing element 52. The computing device 46 may also comprise a display, a keyboard, a mouse, or other user interface components, wired and/or wireless communication element, and other common components—none of which is discussed in detail herein.

The memory element 50 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 50 may be embedded in, or packaged in the same package as, the processing element 52. The memory element 50 may include, or may constitute, a "computer-readable medium". The memory element 50 may store the instructions, code, code statements, code segments, software, firmware, programs, applications, apps, services, daemons, or the like that are executed by the processing element 52. The memory element 50 may also store settings, data, documents, sound files, photographs, movies, images, databases, and the like.

The processing element 52 may comprise one or more processors. The processing element 52 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 52 may generally execute, process, or run instructions, code, code segments, code statements, software, firmware, programs, applications, apps, processes, services, daemons, or the like. The processing element 52 may also include hardware components such as registers, finite-state machines, sequential and combinational logic, and other electronic circuits that can perform the functions necessary for the operation of the current invention. In certain embodiments, the processing element 52 may include multiple computational components and functional blocks that are packaged separately but function as a single unit. The processing element 52 may be in communication with the other electronic components through serial or parallel links that include universal busses, address busses, data busses, control lines, and the like.

The processing element 52 may be operable, configured, or programmed to perform the following functions by utilizing hardware, software, firmware, or combinations thereof. The processing element 52 of the computing device 46 may implement or execute the components of the vendor non-specific computer server software system 10 as described in more detail below.

The bare metal automation interface 12 provides an application programming interface that receives requests and data from the web browser 30 and the REST/SOAP interface 32 and forwards the request and/or data to the appropriate component within the vendor non-specific computer server software system 10. For example, requests received by the bare metal automation interface 12 are forwarded to the request processor 14. The requests may include a particular configuration or setup for one or more of the servers 44. The data may include names of configuration types and/or identifiers of servers 44 to be configured, as well as credential information, including a user name and a password and/or tokens, regarding the user making the request. The bare metal automation interface 12 may utilize REST, SOAP, secure shell (SSH), and the like to communicate with the other components.

The request processor 14 receives and handles requests from the bare metal automation interface 12. Upon receipt of a request, the request processor 14 analyzes the request and instructs the appropriate system component(s) to process the request. For example, if a user wants to configure one of the servers 44, he may submit a request through the web browser 30 to configure one of the servers 44 for a particular purpose. The user provides the specifics of the configuration based on business requirements. The request processor 14 instructs the orchestration engine to perform the server 44 setup, including an appropriate workflow with appropriate tasks, based on the specifics of the request.

The scheduler 16 receives instructions from a runtime environment in which the vendor non-specific computer server software system 10 operates. The scheduler 16 hands off execution of the instructions to the orchestration engine 28.

The alert and notification generator 18 handles processing or sending alerts and notifications in case of any system wide or specific messages to the users of the system 10. For example, when a user requests a process to be performed, the alert and notification generator 18 sends an alert to the user when the process is complete. Alternatively, the alert and notification generator 18 sends an alert to system administrators and/or the user if an error occurred or a problem was encountered during the execution of processes.

The vendor non-specific bare metal interface 20 provides communication to the vendor-specific server interfaces 42. The vendor non-specific bare metal interface 20 may utilize SSH, REST APIs, or vendor specific protocols. The vendor non-specific bare metal interface 20 provides encapsulation of data or objects and a layer of abstraction to the rest of the components of the vendor non-specific computer server software system 10 so that these components do not need to be tightly coupled with the requirements of any one vendor-specific server interface 42. For example, the vendor non-specific bare metal interface 20 receives generalized (vendor-non-specific) commands or instructions from the other components, such as the orchestration engine 28, that are intended for the server 44 from a particular vendor. The vendor non-specific bare metal interface 20 then transmits corresponding vendor-specific commands or instructions to the vendor-specific server interface 42 for the server 44.

The authentication and authorization interface 22 forwards user credentials, such as a user name and a password and/or tokens to the LDAP device 34 and the active directory device 36. The user credentials are received from the bare metal automation interface 12.

The persistence storage interface 24 forwards data to the bare metal asset information database 38. The data may include information related to the servers 44 or other hosts or center for data storage, security roles and capabilities, user preferences, and other information regarding the dependency of the vendor non-specific computer server software system 10.

The GIT interface 26 forwards data to version-controlled data storage systems such as the GIT system 40. The data may include user credentials, such as a user name and a password and/or tokens, and information in formats such as extensible markup language (XML) and comma separated values (CSV).

The orchestration engine 28 generally executes the workflow for one or more requests or tasks. For example, the orchestration engine 28 may perform the steps necessary to apply specified configurations on a selected server 44, apply a network interface card configuration, assign an Internet protocol (IP) address, configure gateways and other components, remove default administrative users, apply a specific security configuration, update firmware to a desired level, instruct the alert and notification generator 18 to notify users with the relevant information etc. The orchestration engine 28 may execute the requests or tasks in a given or specified order. Once all the tasks are completed, the user will be notified by the alert and notification generator 18 about the outcome of the request. The orchestration engine 28 may also store information regarding the execution of each task which in turn can be used to troubleshoot in case of failures.

Figure 3:
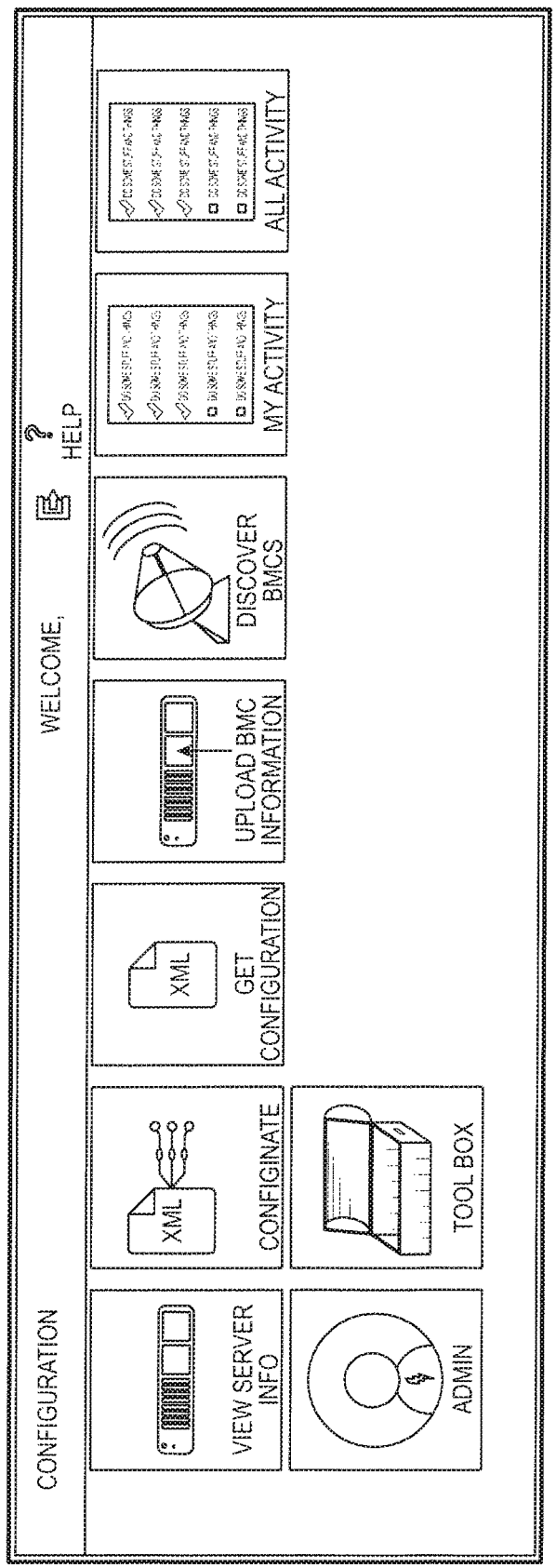
FIG. 3 is a first screen capture of a user interface presented by the vendor non-specific computer server software system, the first screen capture illustrating a first plurality of icons, each of which allows the user to request an activity, to input data, or to manage information or options.
Figure 4:
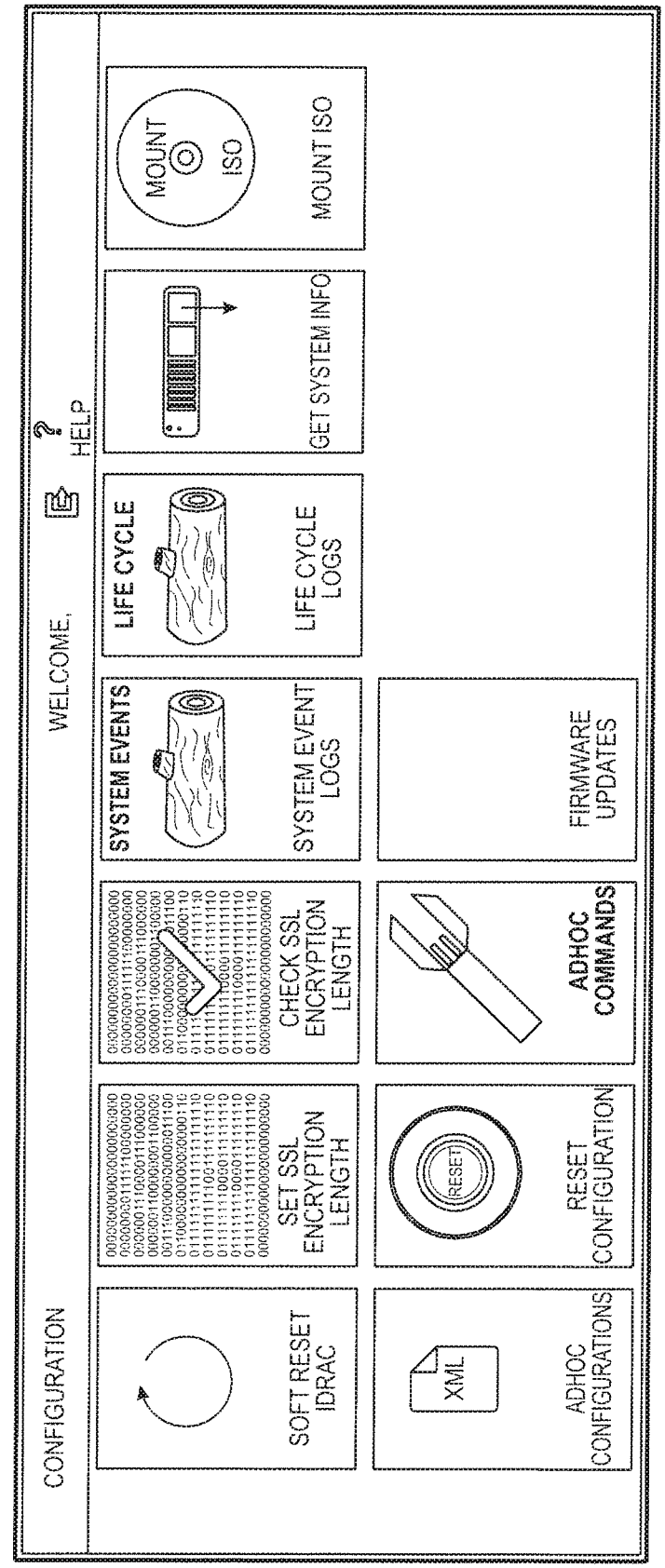
FIG. 4 is a second screen capture of the user interface, the second screen capture illustrating a second plurality of icons, each of which allows the user to request an activity or to retrieve log data.

Referring to FIGS. 3-7, a plurality of screen shots are shown, taken from images of a user interface 48 which is presented to users in the web browser 30. The user interface 48 allows users to request various functions and input data. The user interface 48 also provides output to users, such as the results of the requested activities. FIG. 3 illustrates a first plurality of icons, each of which allows the user to request an activity, such as a configuration, to input data, or to manage information or options. FIG. 4 illustrates a second plurality of icons, each of which allows the user to request an activity, such as a configuration, or to retrieve log data.

Figure 6:
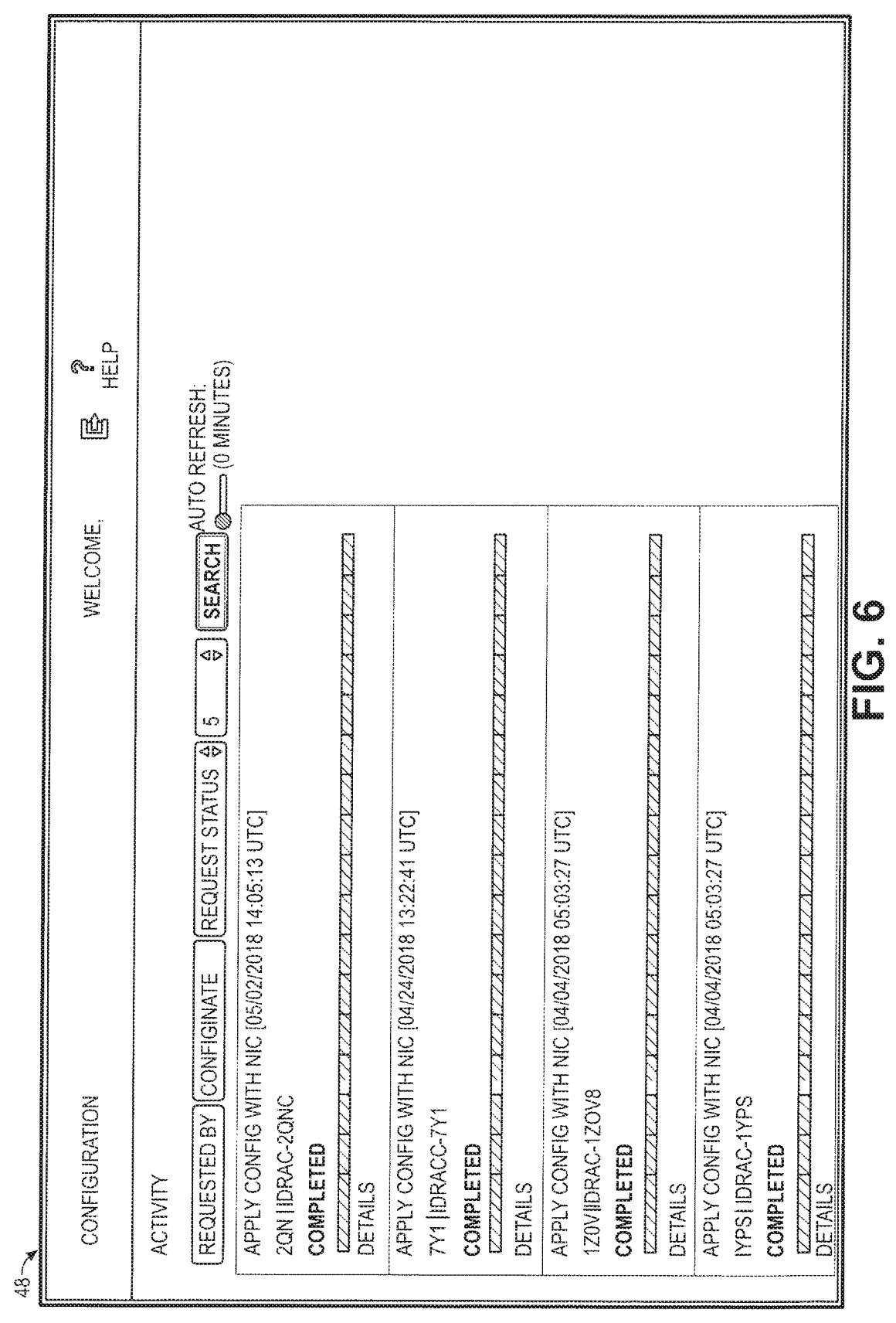

FIG. 5 illustrates a list of filters that can be applied to a requested configuration. FIG. 6 illustrates a log of the results of a requested configuration. FIG. 7 illustrates a log of particular activities associated with a requested configuration.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer server software system implemented on a computing device, the system comprising:
    a bare metal automation interface configured to receive requests for configuration of one or more of a plurality of servers from a plurality of different vendors;
    a request processor configured to receive the requests from the bare metal automation interface and forward the requests;
    a scheduler configured to receive instructions from a runtime environment in which the computer server software system operates and forward the instructions;
    a vendor non-specific bare metal interface configured to interface with a plurality of vendor-specific server interfaces, each vendor-specific server interface communicating with a server of the plurality of servers from a specific vendor of the plurality of different vendors; and
    an orchestration engine configured to execute a workflow for the requests from the request processor and for the instructions from the scheduler to configure the server from the specific vendor.

2. The computer server software system of claim 1, further comprising an alert and notification generator configured to notify users of a status of a request or to alert system administrators if an error occurs.

3. The computer server software system of claim 1, further comprising an authentication and authorization interface configured to forward a user's credentials to a lightweight directory access protocol device or an active directory device.

4. The computer server software system of claim 1, further comprising a persistence storage interface configured to forward data regarding the servers to a bare metal asset information database.

5. The computer server software system of claim 1, further comprising a GIT interface configured to forward a user's credentials to a GIT system.

6. The computer server software system of claim 1, wherein the bare metal automation interface is further configured to receive data from a user including a user's name, a password, and/or tokens.

7. The computer server software system of claim 1, wherein the scheduler is further configured to forward the instructions to the orchestration engine.

8. The computer server software system of claim 1, wherein the vendor non-specific bare metal interface is further configured to receive vendor-non-specific commands intended for a server and to transmit corresponding vendor-specific commands to the vendor-specific server interface for the server.

9. The computer server software system of claim 1, wherein the bare metal automation interface is configured to receive requests from a user using a web browser.

10. The computer server software system of claim 1, wherein the bare metal automation interface is configured to receive requests from other systems using a representational state transfer and simple object access protocol interface.

11. A computer server software system implemented on a computing device, the system comprising:
    a bare metal automation interface configured to receive requests for configuration of one or more of a plurality of servers from a plurality of different vendors, the requests being received from a user using a web browser, and other systems using a representational state transfer and simple object access protocol interface;
    a request processor configured to receive the requests from the bare metal automation interface and forward the requests;
    a scheduler configured to receive instructions from a runtime environment in which the computer server software system operates and forward the instructions;
    a vendor non-specific bare metal interface configured to interface with a plurality of vendor-specific server interfaces, each vendor-specific server interface communicating with a server of the plurality of servers from a specific vendor of the plurality of different vendors, and to receive vendor-non-specific commands intended for a server and to transmit corresponding vendor-specific commands to the vendor-specific server interface for the server; and
    an orchestration engine configured to execute a workflow for the requests from the request processor and for the instructions from the scheduler to configure the server from the specific vendor.

12. The computer server software system of claim 11, further comprising an alert and notification generator configured to notify users of a status of a request or to alert system administrators if an error occurs.

13. The computer server software system of claim 11, further comprising an authentication and authorization interface configured to forward a user's credentials to a lightweight directory access protocol device or an active directory device.

14. The computer server software system of claim 11, further comprising a persistence storage interface configured to forward data regarding the servers to a bare metal asset information database.

15. The computer server software system of claim 11, further comprising a GIT interface configured to forward a user's credentials to a GIT system.

16. The computer server software system of claim 11, wherein the bare metal automation interface is further configured to receive data from a user including a user's name, a password, and/or tokens.

17. The computer server software system of claim 11, wherein the scheduler is further configured to forward the instructions to the orchestration engine.

18. A computer server software system implemented on a computing device, the system comprising:
- a bare metal automation interface configured to receive requests for configuration of one or more of a plurality of servers from a plurality of different vendors;
- a request processor configured to receive the requests from the bare metal automation interface and forward the requests;
- a scheduler configured to receive instructions from a runtime environment in which the computer server software system operates and forward the instructions;
- an alert and notification generator configured to notify users of a status of a request or to alert system administrators if an error occurs;
- an authentication and authorization interface configured to forward a user's credentials to a lightweight directory access protocol device or an active directory device;
- a persistence storage interface configured to forward data regarding the servers to a bare metal asset information database;
- a GIT interface configured to forward a user's credentials to a GIT system;
- a vendor non-specific bare metal interface configured to interface with a plurality of vendor-specific server interfaces, each vendor-specific server interface communicating with a server of the plurality of servers from a specific vendor of the plurality of different vendors; and
- an orchestration engine configured to execute a workflow for the requests from the request processor and for the instructions from the scheduler to configure the server from the specific vendor.

19. The computer server software system of claim 18, wherein the vendor non-specific bare metal interface is further configured to receive vendor-non-specific commands intended for a server and to transmit corresponding vendor-specific commands to the vendor-specific server interface for the server.

20. The computer server software system of claim 18, wherein the bare metal automation interface is configured to receive requests from a user using a web browser and receive requests from other systems using a representational state transfer and simple object access protocol interface.

* * * * *